United States Patent [19]
Kimura et al.

[11] Patent Number: 5,343,256
[45] Date of Patent: Aug. 30, 1994

[54] IMAGE CODING APPARATUS

[75] Inventors: Jun-ichi Kimura, Hachioji; Masaaki Takizawa, Tokyo, both of Japan

[73] Assignee: Hitachi, Ltd., Tokyo, Japan

[21] Appl. No.: 873,164

[22] Filed: Apr. 24, 1992

[30] Foreign Application Priority Data

Apr. 26, 1991 [JP] Japan .................................. 3-096799

[51] Int. Cl.⁵ .............................................. H04N 7/01
[52] U.S. Cl. .................... 348/718; 348/390; 348/439; 348/513
[58] Field of Search ................ 358/134, 133, 140, 85; 348/513, 714, 718, 390, 439; H04N 7/01

[56] References Cited

U.S. PATENT DOCUMENTS

| | | | |
|---|---|---|---|
| 4,057,836 | 11/1977 | Munsey | 358/134 |
| 4,183,058 | 1/1980 | Taylor | 358/134 |
| 4,698,676 | 10/1987 | Kubota | 358/140 |
| 4,924,311 | 5/1990 | Ohki | 358/85 |

*Primary Examiner*—Howard W. Britton
*Attorney, Agent, or Firm*—Antonelli, Terry, Stout & Kraus

[57] ABSTRACT

An image coding apparatus for sequentially coding an input image signal that is supplied at a predetermined frame rate at a rate that is independent of such a frame rate, thereby obtaining a coding image signal for transmission from which frames are thinned out. The apparatus comprises: a frame memory having a recording area corresponding to one frame of the input image signal to store the input image signal; a write address generator to sequentially generate write addresses in the frame memory in correspondence to the input image signal; a coder to execute a coding process by using the signal which is read out from the frame memory; a read address generator to sequentially generate read addresses in the frame memory in response to a frame change request which is generated from the coder; and a write limiter for comparing the write address and the read address, for stopping the subsequent writing operation of the frames written in the frame memory when the write address approaches the read address, and for restarting the writing operation from the head of the next frame.

10 Claims, 12 Drawing Sheets

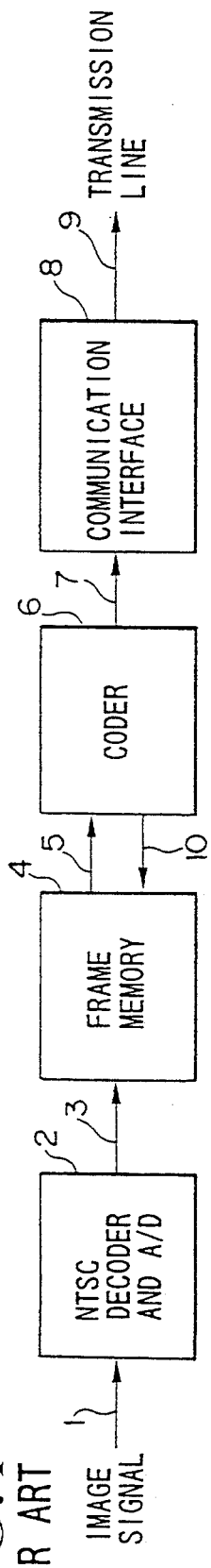
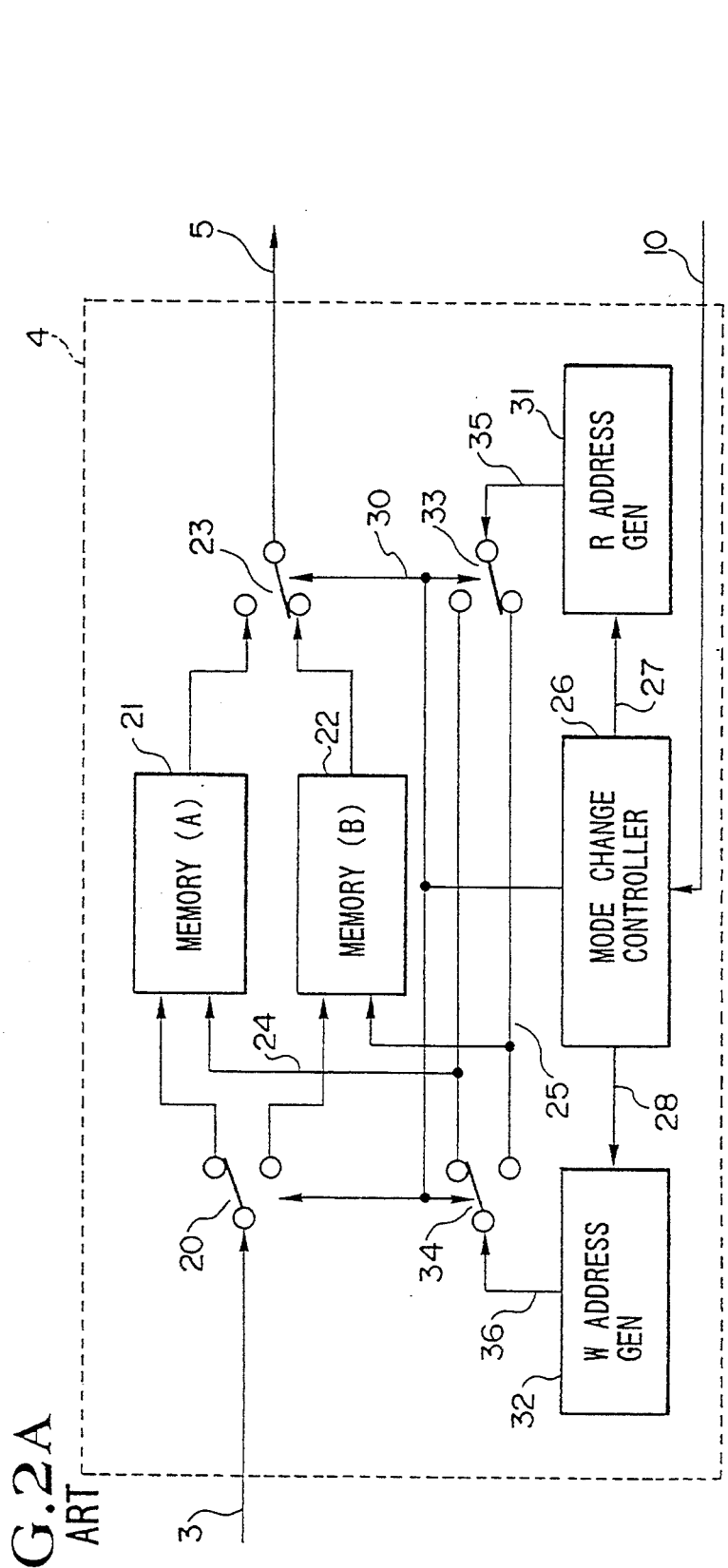
FIG. 1 PRIOR ART
FIG. 2A PRIOR ART

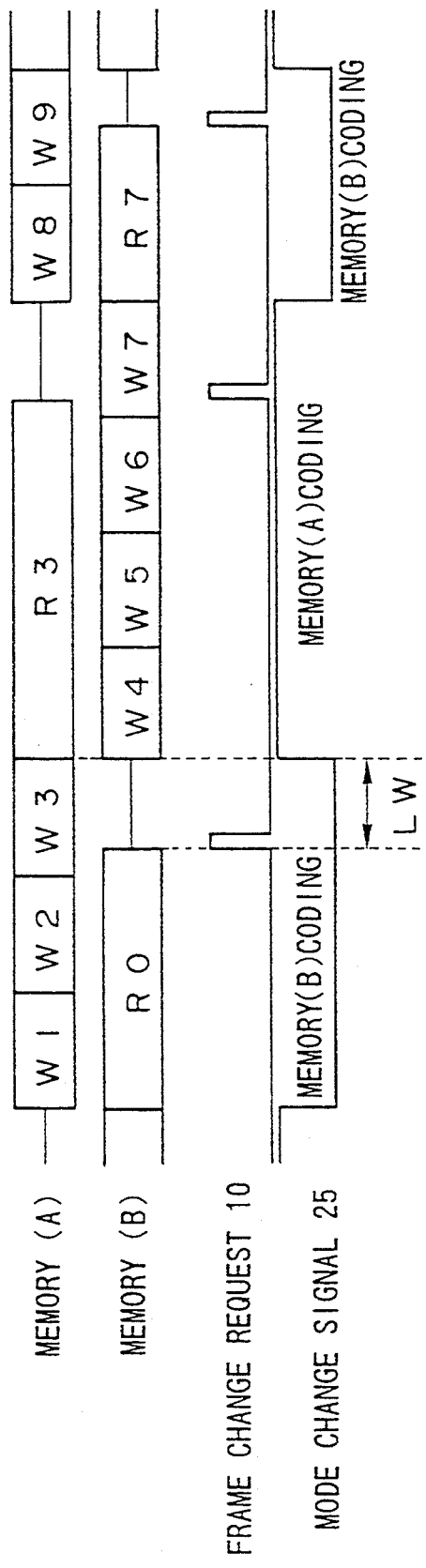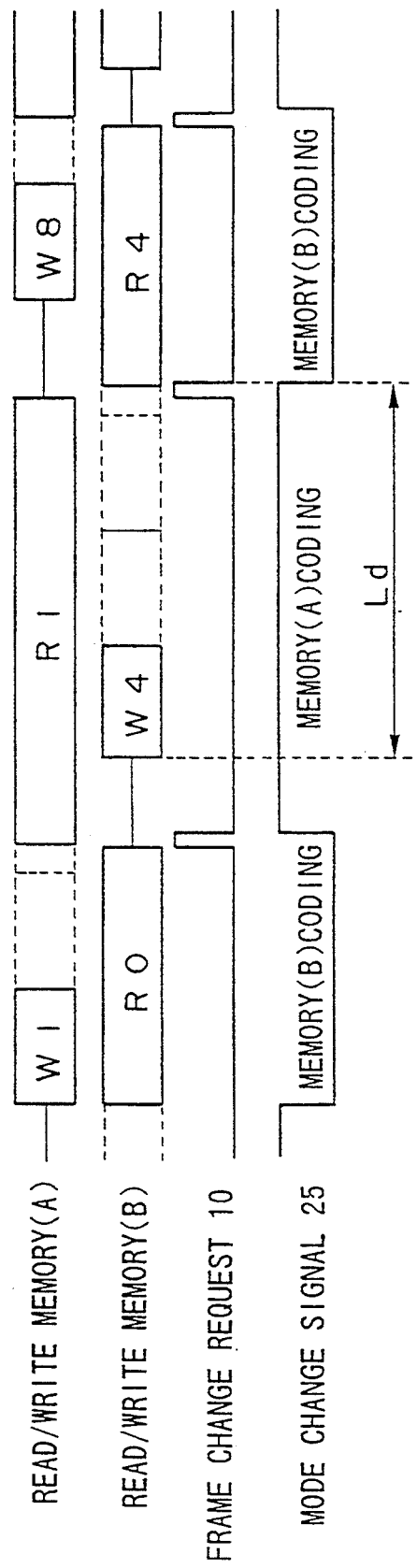

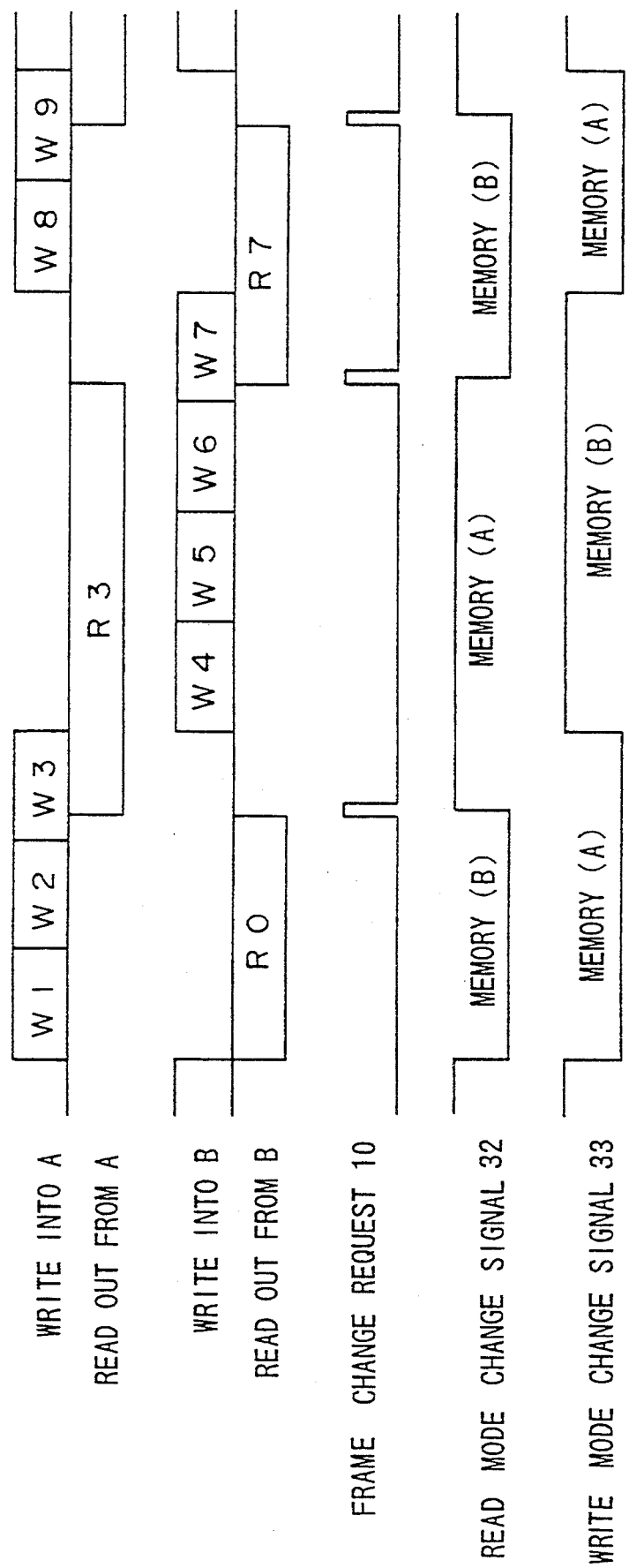

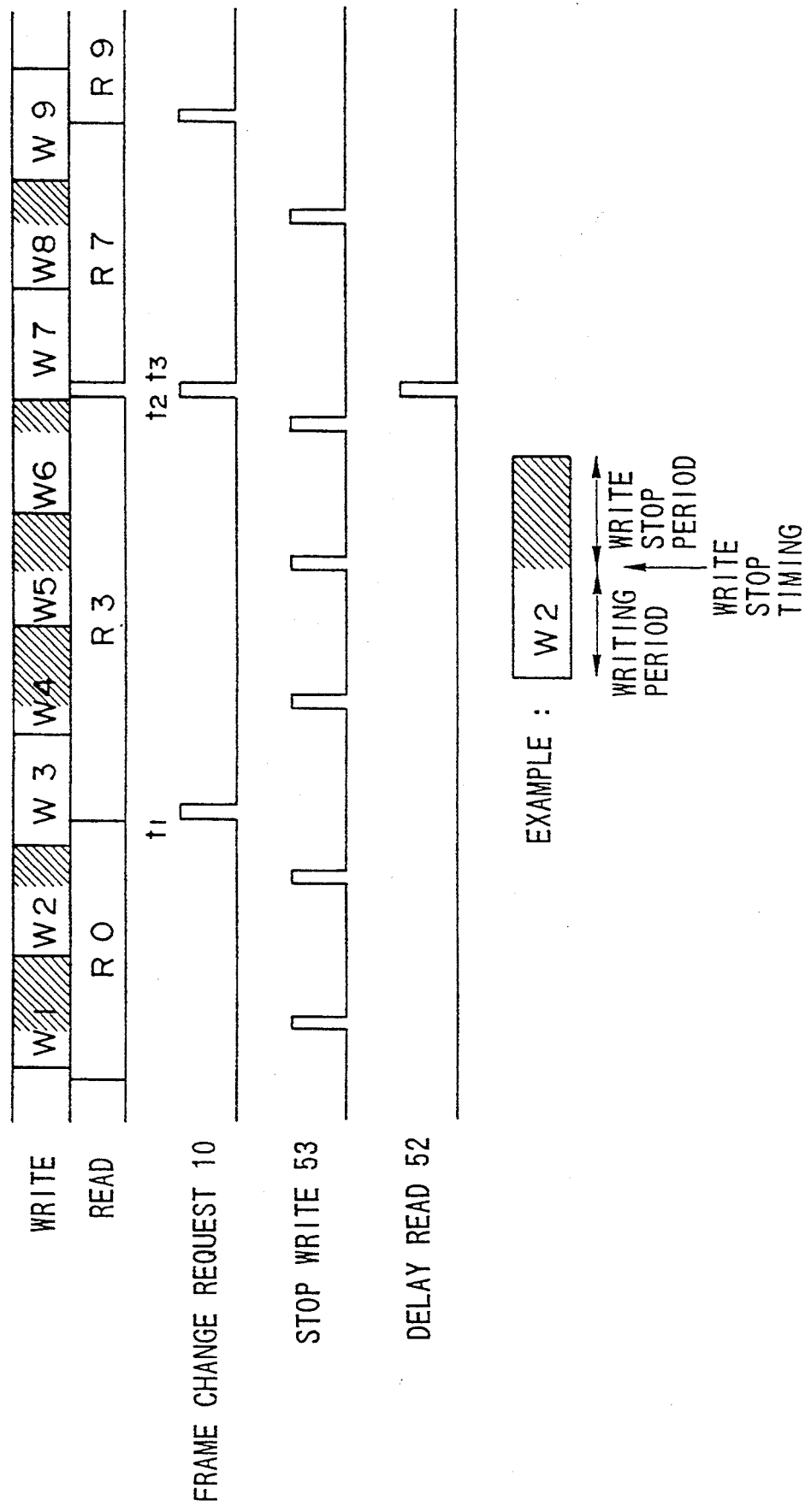

EXAMPLE IN WHICH WRITE ADDRESS CATCHES UP

EXAMPLE IN WHICH WRITE ADDRESS APPROACHES

EXAMPLE IN WHICH WRITE ADDRESS CATCHES UP

EXAMPLE IN WHICH WRITE ADDRESS PROGRESSES

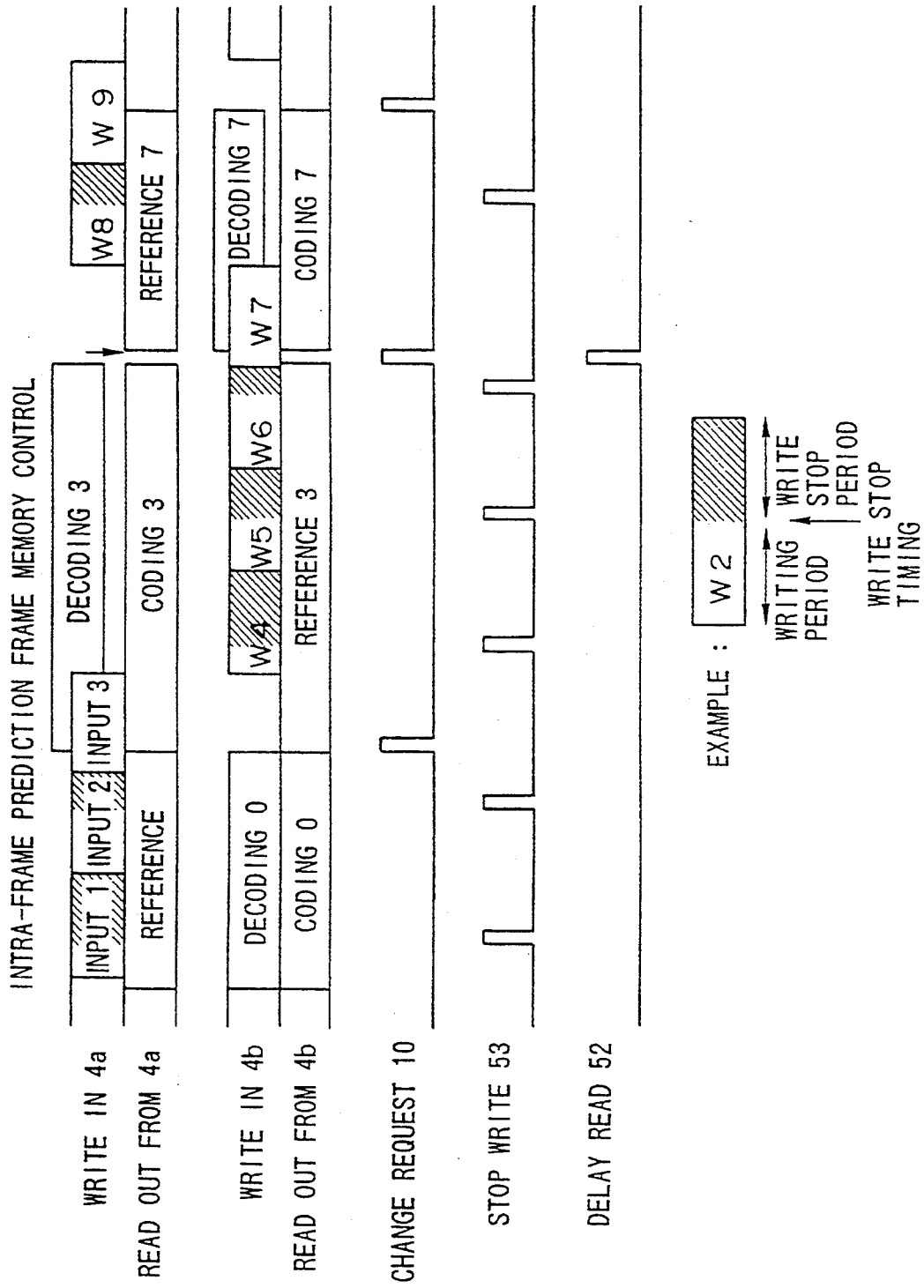

A. EXAMPLE IN WHICH SIGNAL IS WRITTEN INTERMITTENTLY

B. EXAMPLE IN WHICH SIGNAL IS REPETITIVELY WRITTEN

HATCHED PORTION : WRITE STOP PERIOD

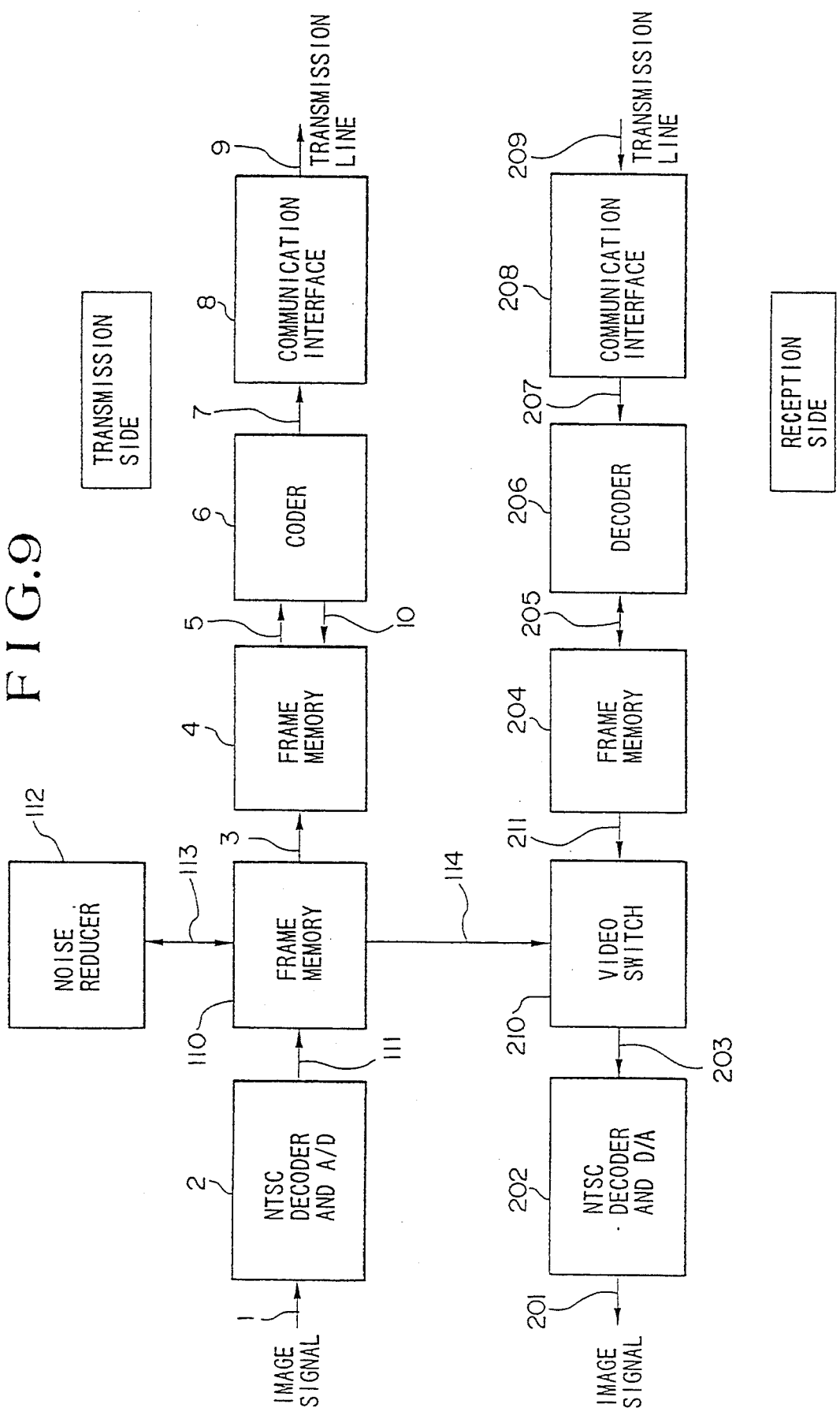

IMAGE CODING APPARATUS

BACKGROUND OF THE INVENTION

The invention relates to a coding apparatus of a television signal (hereinafter, referred to as a TV signal) or the like and, more particularly, the invention intends to miniaturize a high efficiency coding apparatus for transmitting a TV signal by using a low speed line.

It is known that a transmission speed of about 100 Mb/sec is needed to transmit a TV signal by a digital signal without compressing the signal. A high efficiency coding system has been proposed to reduce the transmission speed and the transmission costs. The high efficiency coding denotes processes such that a TV signal to be presently encoded is predicted by using a transmitted preceding picture plane (reference frame), a transmitted signal on a scanning line just over the present scanning line, or the like and a difference (prediction error) between the prediction value and the true signal is obtained and the difference is encoded and transmitted. A system to predict the TV signal from the reference frame is called an inter-frame prediction system. A system to predict the TV signal from only the frame to be coded such as a scanning line just over the present scanning line or the like is called an intra-frame prediction system. In any of the above coding systems, when the transmission speed is slow, in many cases, a frame dropping process to thin out the frames to be transmitted is executed. Since the details of the above coding systems are not directly concerned with the present invention and have been described in detail in "Multi-dimensional TV Signal Processing of TV Image", by Takahiko Fukinuki, The Nikkan Kogyo Shimbun Ltd., Pages 270-271 and 225-226, its detailed description is omitted here.

FIG. 1 is a whole constructional diagram of a TV signal coding apparatus. An input TV signal 1 is supplied to an NTSC decoder and A/D converter 2, by which a luminance signal and a chrominance signal are extracted from an NTSC signal as an ordinary TV signal and converted into digital signals. The digital signals are stored into a frame memory 4. The processing order of the NTSC decoding and the A/D conversion can also be reversed. The digital image signal stored in the frame memory 4 is read out every pixel by a coder 6, is subjected to compressing and coding processes and is generated as a code word 7. The code word 7 is converted by a communication interface 8 into a signal format which is specified by a transmission path and is supplied onto a transmission line 9 for transmitted.

In many cases, the frame memory 4 includes a buffer memory using two memories in order to reduce a writing waiting time for the frame memory. The operations in the above case are as shown in FIGS. 2A and 2B. That is:

(A) One memory 21 of the two frame memories is used to write the input TV signal. Another memory 22 is used to read out a T signal for coding.

(B) When the coding process of one frame is finished, the roles of the two frame memories are exchanged by a frame change request signal 10. The memory 21 used to write the TV signal is used to code the TV signal. The memory 22 used for reading out and coding the TV signal is used to write the TV signal.

To execute the above processes, a read address generating circuit 31 and a write address generating circuit 32 are provided, and a read address 35 generated from the read address generating circuit 31 and a write address 36 generated from the write address generating circuit 32 are switched to the memory side set by switches 33 and 34, respectively. Synchronously with them, the input and output data are switched by switches 20 and 23 on the basis of a change signal 30.

A mode change controller 26 switches the memories as described in the control example 1 shown in FIG. 2B or in the control example 2 shown in FIG. 2C.

In the reading or writing operation of an image from-/into the frame memory 4, the following conditions are generally satisfied when considering a frame unit.

(A) The writing operation of an image write signal 3 can only be started approximately every about 33 msec in synchronism with the frame of the TV signal.

(B) An image read signal 5 is read out at a timing according to the process of the coder 6 asynchronously with the writing timing.

In the reading operations of the image write signal 3 and the image read signal 5, the following conditions are generally satisfied when considering a pixel unit.

(1) The writing operation of pixels is sequentially periodically executed in accordance with the order of the scanning lines of the TV signal preferentially in the horizontal direction from the left upper position of the screen to the right lower position.

(2) The reading operation of pixels is executed from the left upper position of the screen to the right lower position as a whole. However, there is a case where the pixels are read out in accordance with the order irrespective of the writing order within a predetermined range when considering a local area.

(3) A reading period of the pixels is equal to or longer than a writing period of the pixels. That is, a writing time of one frame is certainly equal to or shorter than a reading time.

(4) The maximum value of the time which is required from a time point at which one pixel has been read out to a time point at which the next pixel is read out cannot be specified.

Among the above conditions, the point of the item (1) such that the signal writing operation is started only from a special time becomes a particular problem. There is a case where a waiting time shown as $L_w$ in FIG. 2B occurs for a period of time until the frame transferred from a TV camera is actually coded. A time to actually execute a coding process is reduced due to such a waiting time. Consequently, there occurs a problem such that the actual processing ability deteriorates as compared with the maximum ability or an apparatus scale increases by preliminarily making a processing design in consideration of such a waiting time on the contrary.

No waiting time occurs by fetching only the frame just after the start of the coding process as shown in FIG. 2C. In such a case, however, a delay time shown by $L_d$ in the diagram occurs. It is well known that a mental burden increases when a delay time which occurs until the TV signal obtained by photographing an object image by the TV camera is displayed to a person who receives the TV signal is long.

Means for effectively eliminating those problems has been disclosed in JP-A-2-203689. As shown in an example of FIG. 3, it is a feature of the invention that, in the double buffer memory system, there are provided memories 61 and 62 (simultaneous reading and writing type memories) whose reading and writing operations can be simultaneously or instantaneously switched and the mode change-over switches 20, 34, 23, and 33 which can independently switch the reading and writing operations. The image write signal 3 obtained by repetitively photographing the object image by the TV camera is written into the memory 62 for writing. After completion of the coding process of one frame due to the signal reading operation from the memory 61, the read switches 23 and 33 are switched by a read change signal 40 irrespective of the writing state into the memory 62, thereby setting the memory 62 into a mode to read out the coding signal. In this instance, even after the read switches 23 and 33 were switched, the TV signal 3 photographed by the TV camera is continuously written until the writing operation of the frame is finished. After completion of the writing operation of the frame, the write switches 20 and 34 are switched by a write change signal 41. The reading operation is executed just after the read switches 23 and 33 were switched. The coding operation is temporarily stopped only in the case where the read address 35 catches up to the write address 36. The above control is performed by a comparator 46 and a control signal 47, thereby preventing that the above addresses coincide.

SUMMARY OF THE INVENTION

As mentioned above, there is a problem such that two frame memories for coding are needed to maintain the processing ability of the conventional coding apparatus and it is consequently difficult to miniaturize the apparatus. It is, therefore, an object of the invention to reduce the number of frame memories while maintaining the processing ability similar to the conventional one.

It is a feature of the invention that one frame memory which corresponds to one picture plane and whose reading and writing operations are independently executed is used as a frame memory to code a TV signal. The present invention provides a write address generator to generate a write address corresponding to the frame scan of the TV signal; a read address generator to generate a read address for a coder; and a circuit for comparing the write address and the read address and for stopping the writing operation of the frame when the write address approaches the read address.

According to the construction having two frame memories in the conventional example, while the coding process due to the reading operation from one of the two frame memories is being executed, the writing operation from the next frame is performed for the other frame memory. On the other hand, the construction of the present invention differs from the conventional construction with respect to a point that only one frame memory is used and the writing operation is started every frame of the TV signal for every same frame memory from which the reading operation is being executed. Since the writing operation is executed in parallel at a point in time when the reading timing of a certain frame approaches a writing timing, the frame which is being written can be soon read out just after completion of the reading operation. There is no waiting time for the reading operation for coding. Further, since the writing operation of the frame is stopped when the write address approaches the read address, the frame is not switched during the coding process.

Another feature of the invention corresponds to the case where the pixels are read out in accordance with the order irrespective of the writing order within a predetermined range when considering a local area, although the pixels are read out from the left upper position of the screen to the right lower position as a whole. That is, there is further provided delay means for delaying the start of the reading operation so long as the write address exists in a predetermined interval from the head of the screen and for requesting the switching of the read frame to start the reading operation at a point in time when the writing operation has progressed. The above construction, prevents the read address from outrunning the write address even for the random reading operation within a predetermined range as mentioned above, to further presented the TV signal data of a plurality of frames from being read out. Such a delay occurs when the writing of a new frame has been started just before the completion of the reading operation of a certain frame and a probability of such a situation is low. Thus, the reading waiting time can be substantially ignored.

BRIEF DESCRIPTION OF THE DRAWINGS

FIG. 1 is a block diagram of a conventional image coding apparatus;

FIGS. 2A, 2B, and 2C comprise a diagram showing an example 1 of a conventional frame memory having two memories and its control timing charts;

FIGS. 3A and 3B comprise a diagram showing an example 2 of a conventional frame memory having two memories and its control timing chart;

FIGS. 4A and 4B are diagrams showing an embodiment of a construction of a frame memory according to the invention;

FIGS. 7A and 7B diagrams showing an embodiment of a construction of a frame memory in the case where the invention is applied to the inter-frame coding;

FIG. 9 is a diagram showing a construction of a coding/decoding apparatus of the signals which are intermittently written.

DESCRIPTION OF THE PREFERRED EMBODIMENTS

Figure 3A:
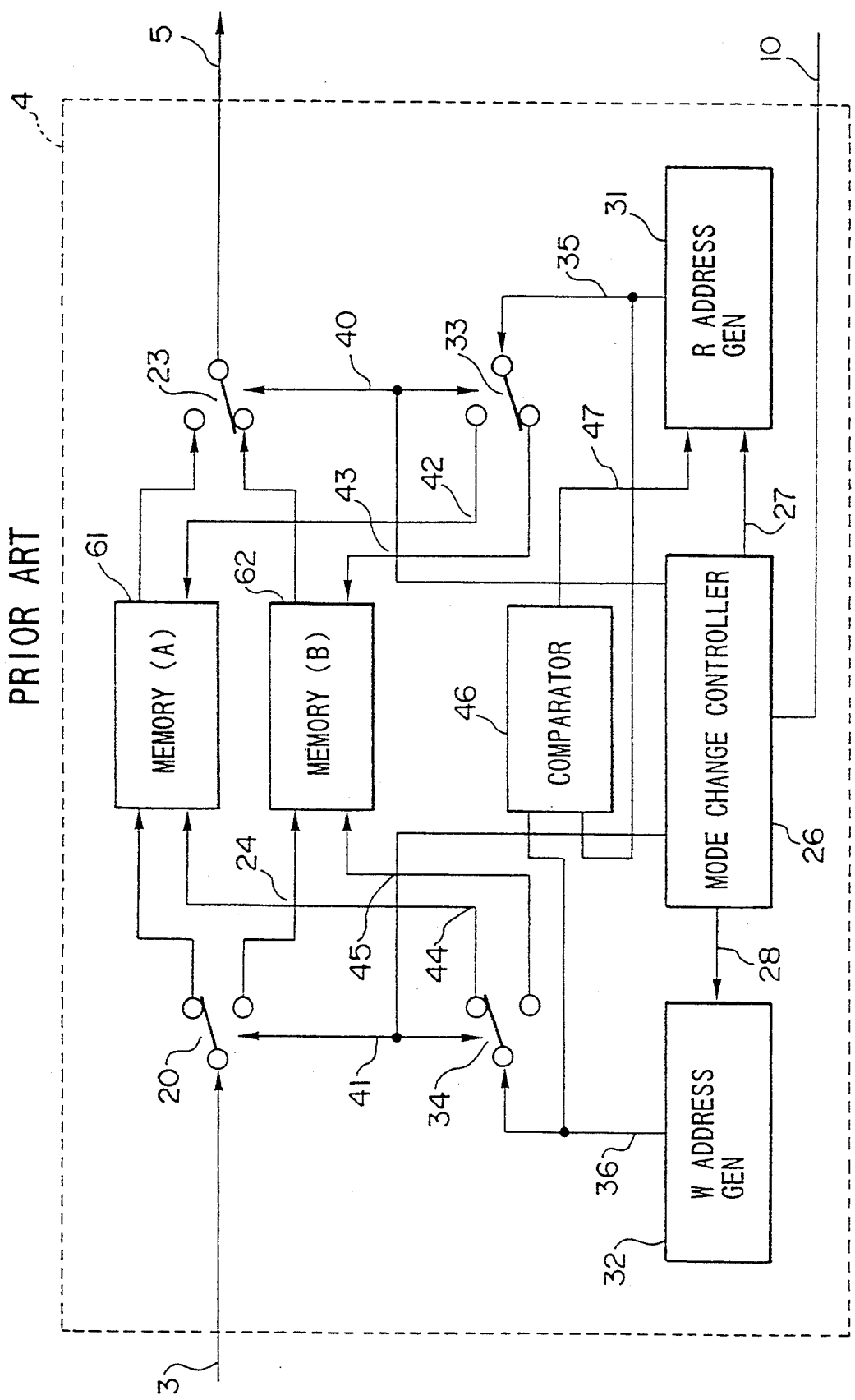
Figure 4A:
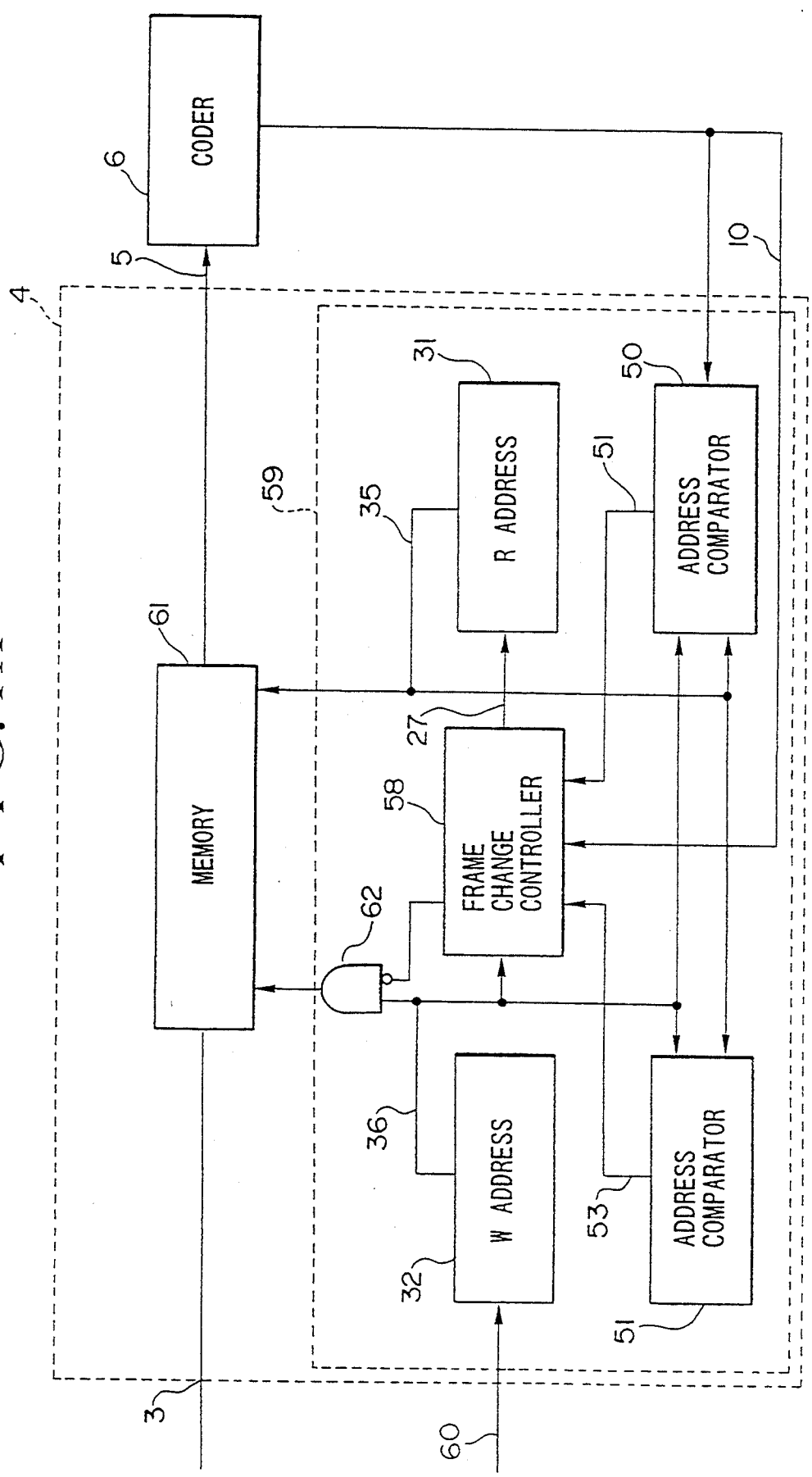

FIG. 4A shows an embodiment of the invention.

In the diagram, reference numeral 61 denotes the simultaneous reading and writing type memory having a recording area of one frame of an image. Reference numeral 59 denotes a section corresponding to the present invention. A sync signal 60 of the input image signal 3 is led to the write address generator 32. The write address generator 32 generates the write address 36 which is specified by horizontal and vertical two-dimensional addresses in correspondence with the horizontal and vertical scans of the image signal 3. Thus, the image signal 3 is sequentially written at the positions which are indicated by the write addresses 36 in the memory 61. On the other hand, when a read start command 27 is given from a frame change controller 58 to the read address generator 31, the generator 31 generates the read addresses 35 to sequentially designate the whole recording area in the memory 61. The generating order of the read addresses 35 corresponds to the coding processes of the coder 6 and that, corresponds approximately to the scanning order of the input image signal. However, since the coding processes of the coder 6 need both the data of a target pixel and the data of the pixels close to the target pixel, the read addresses 35 are generated within a readable range including the target pixel. The readable range is shifted in accordance with the address change of the target pixel as will be explained in detail hereinbelow. A time which is required for coding one frame is longer than a frame period of the input image signal.

As mentioned above, the read address 35 and the write address 36 are independently formed, and the writing operation of the image signal 3 into the memory 61 and the reading operation from the memory 61 are executed in parallel. However, in the case where the write address 36 is located before the read address 35 and is close to the read address 35 (FIG. 5B), the subsequent writing operation of the relevant picture plane is stopped. An address comparator 51 checks a difference between the read address 35 and the write address 36 and generates a write stop signal 53 when a value of the difference is equal to or less than a threshold value. When the frame change controller 58 receives the write stop signal 53, the controller 58 closes a gate 62 until the write address 36 is returned to the head of the screen and inhibits the writing operation into the memory 61 for the stop period of time. A hatched portion in the timing chart of FIG. 4B indicates a period of time during which the writing operation is stopped.

Figure 5A:
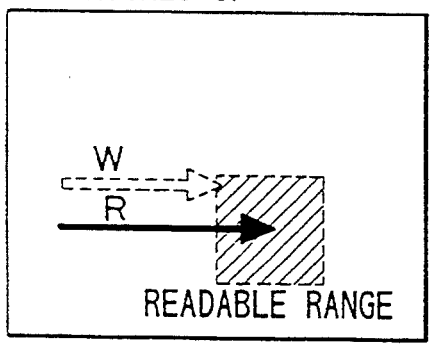
FIGS. 5A to 5D are diagrams showing the relations between a write address and a read address.
Figure 5B:
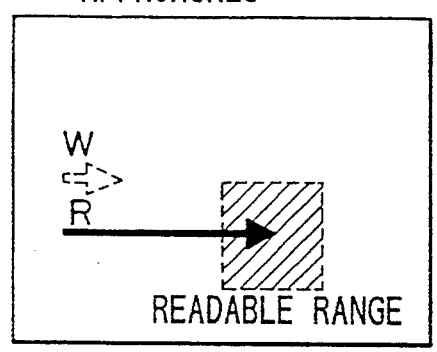
Figure 5C:
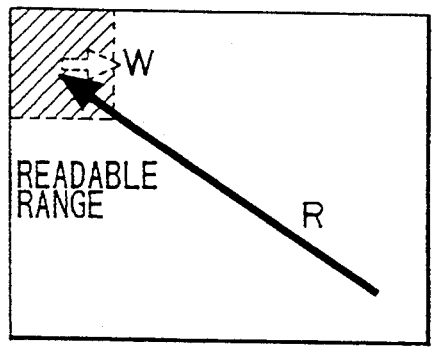
Figure 5D:
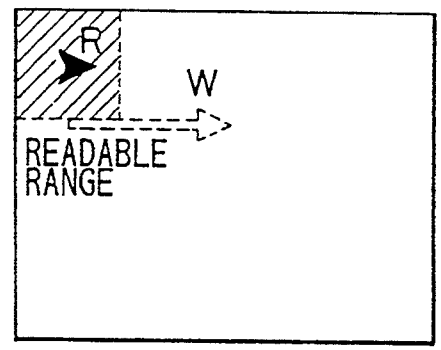

When the controller 58 receives the frame change request 10 from the coder 6, the controller 58 soon after generates the read start command 27. At this time point, for instance, $t_1$ in FIG. 4B indicates a period of time during which the frame shown by $W_3$ is being written and the image signal of such a frame is read out for a period of time $R_3$. During such a period of time, the reading operation of a plurality of frames is not executed due to the above mentioned write-inhibiting operation. Particularly, when the frame change request 10 is generated, for example, at a time point $t_2$ just after the write address 36 was returned to the head of the screen, the frame change controller 58 generates the read start command 27 at a time point $t_3$ with the elapse of a predetermined delay time. That is, at the time point $t_2$, the write address 36 is located near the head of the screen as shown in FIG. 5C. In this instance, when the read address 35 is returned to the head of the screen, the read address is not-sequentially moved (ex. blockwise or at random) within a mesh readable range shown in each of FIGS. 5A to 5D. Therefore, there is a possibility that the read address 35 will outrun the write address 36. Accordingly, the read start command 27 is delayed until the write address 36 progresses to a certain extent as shown in FIG. 5D, thereby inhibiting the image data of a plurality of frames from being read out. An address comparator 50 in FIG. 4A is provided to control the delay of the start of the reading operation. When the value of the write address 36 at the time of the generation of the frame change request 10 is smaller than the threshold value, a read delay signal 52 is generated, thereby delaying the read start command 27 which is given from the frame change controller 58 to the read address generator 31. FIGS. 5A to 5D are diagrams showing the relationship between the read address and the write address. In FIGS. 5A to 5D, a solid line arrow indicates a read address, a broken line arrow represents a write address, and a mesh portion shows a range where there is a possibility that the signal is subsequently read out at a point in time when the signal has been read out up to the preceding point of the solid line arrow. Such a read possible range varies in dependence on the pixels which are used for prediction or the like. FIG. 5A shows the case where the write address catches up to the read address. FIG. 5B shows the case where the write address approaches the read address. FIG. 5C shows the case where the read address approaches the write address. FIG. 5D shows the case where only the write address progresses after the state of FIG. 5C.

In the foregoing embodiment, it is sufficient to execute the comparing operations of the address comparators 50 and 51 by using read and write vertical addresses. Table 1 shows an example of the comparison of the addresses.

TABLE 1

| Address distance<br>da (= wa − ra) | Control<br>operation |
| --- | --- |
| da > ThR | Ordinary operation |
| ThR ≧ da ≧ 0 | Delay of start to read |
| 0 > da ≧ −ThW | Stop to write |
| −Th > da | Ordinary operation | wa: write vertical address
ra: read vertical address

That is, the address comparator 50 detects that the value of (the write vertical address—the read vertical address) is equal to or larger than 0 and is also equal to or less than a predetermined value ThR. When the address lies within such a range, the timing to start the reading operation is delayed by the read start delay signal 52. The address comparator 51 detects that the value of (the read vertical address—the write vertical address) is larger than 0 and is also equal to or less than a predetermined value ThW. When the address lies within such a range, the write stop signal 53 is generated. When the write stop signal 53 is generated, the write address 36 is returned to the head of the screen and the signals subsequent to the signals displayed on the screen are not written into the memory. Both of ThR and ThW are equal to zero or positive values and need to be preset in accordance with a predicting method or the like. However, they can be also changed during the coding operation. In the above example, the addresses are compared by using vertical addresses. However, in the case of executing the image writing operation preferentially in the vertical direction, that is, when the image is first written in such a direction from the pixel at the left upper position of the screen to the pixel at the left lower position of the screen, a higher efficiency is derived by using the horizontal addresses. A similar effect is also obtained by comparing after two-dimensional addresses were converted into one-dimensional addresses by a predetermined converting method.

By controlling the invention as mentioned above, the operations as shown in a timing chart of FIG. 4B are executed. In the timing chart, picture planes $W_3$, $W_7$, and $W_9$ are stored into the memory and coding processes are executed for periods of time $R_3$, $R_7$, and $R_9$. As for picture planes $W_1$, $W_2$, $W_4$, and the like, the write signal catches up to the read signal during the writing operation of such a picture plane and the write stop signal 53 is generated. In the timing chart of FIG. 4B, there is shown an example in which the time point corresponding to the end of the reading process indicated by $R_3$ and the time point corresponding to the start of the storage of the picture plane shown by $W_7$ almost coincide. In such a case, the read start delay signal 52 is generated, thereby delaying the start of the process shown by R₇.

Figure 6:
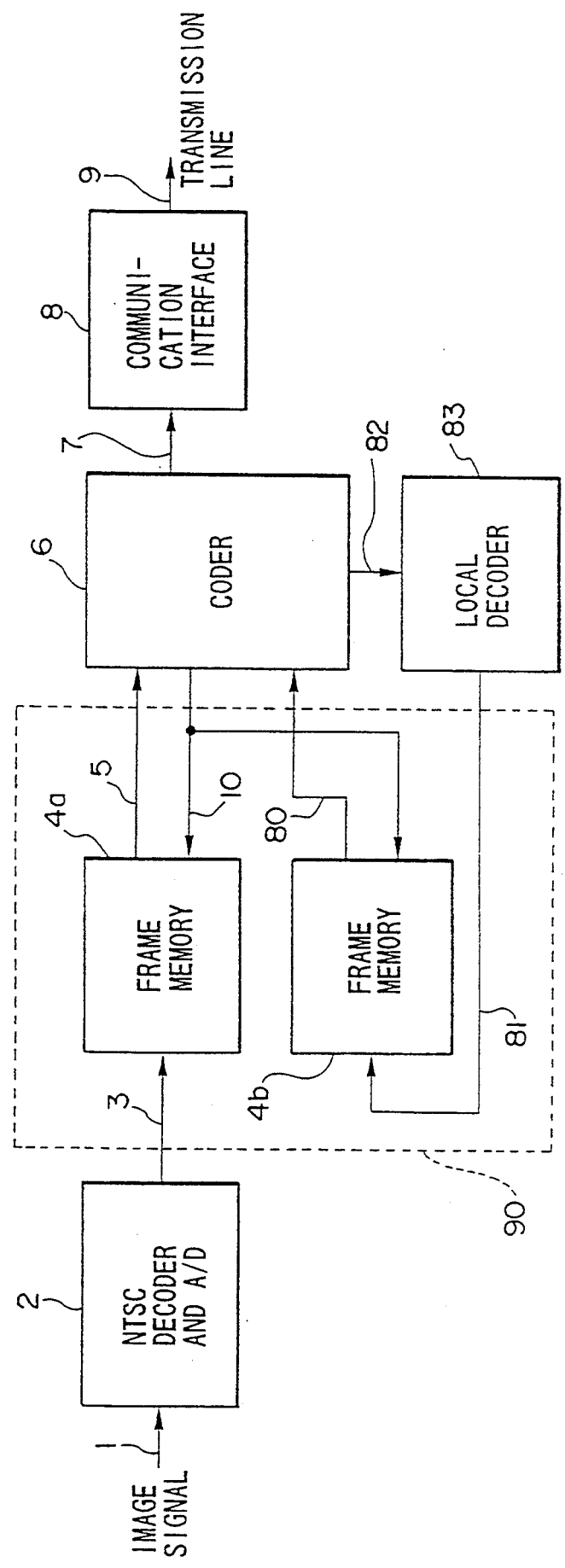
FIG. 6 is a block diagram of an inter-frame coder.
Figure 7A:
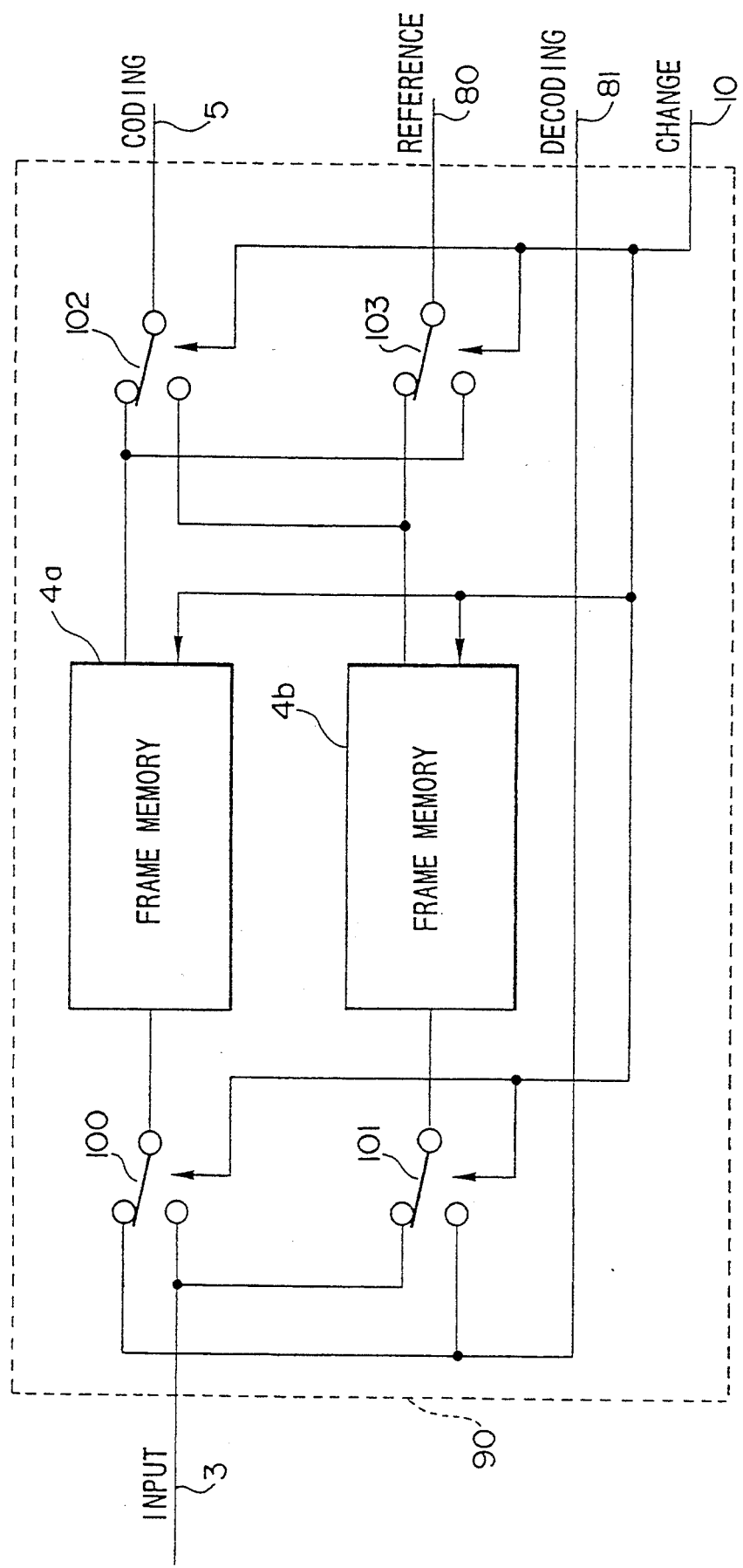

FIG. 7A shows an example of the inter-frame coding according to the second embodiment of the present invention. Prior to explaining FIG. 7A, the inter-frame coding operation will be first described by using FIG. 6.

Since the circuits having the functions similar to those in the circuits shown in FIG. 1 are designated by the same reference numerals, their descriptions are omitted here. An inter-frame coder 6 predicts the image (coding image) signal 5 to be coded from now on by using an image (reference image) signal 80 transmitted just before and codes a prediction error and transmits. The coding signal is also supplied as a signal 82 to a local decoder 83 in the coding apparatus and is then decoded. Further, the local decoder 83 reproduces an original image (decoding image) signal 81 by using both the decoded prediction error signal and the reference image signal 80 used before, and stores the image signal 81 into a frame memory (FM) 4b. The signal 81 is used for a reference image when coding the next picture plane.

In the inter-frame coding of FIG. 6, circuits with the constructions shown in FIG. 2 can be directly used as frame memories 4a and 4b. In such a case, four memories are needed.

FIG. 7A shows a circuit in which four memories, which are necessary in the conventional apparatus, is reduced to two memories by using the prevention invention. The circuit of FIG. 7A corresponds to a circuit 90 in FIG. 6.

The operation in the case where signal changeover switches 100, 101, 102, and 103 are selected as shown in FIG. 7 will now be described. The input image signal is stored into the frame memory 4b. The present invention is used in the frame memory 4b. The reference image has already been stored in the frame memory 4b. Just before the address of the input image signal catches up to the address of the reference image signal, the writing operation is stopped and the address is returned to the head of the screen. When the end of the coding of one picture plane and the start of the writing operation of the input image are almost simultaneously executed, the start of the coding of the next picture plane is slightly delayed.

On the other hand, the coding image has already been stored in the frame memory 4a and the decoded signal is also written therein. After the coding image was read and coded, it is decoded and the resultant reproduced signal is written into the same address as the read address. Since the reproduction signal is written into the portion which became unnecessary due to the reading operation, the write address doesn't overtake the read address. Therefore, although there is no need to compare the addresses or the like, in the portions shown by the input 3 and the decoding 3 in a timing chart of FIG. 7B, it is necessary to write both the input signal 3 and the decoding signal 81 by switching the switch 100. The above operations are performed by either a method where the switch 100 is switched at a high speed and two kinds of signals are alternately written or a method whereby a buffer memory is provided and the signals are alternately written every plurality of pixels. It will be obviously understood that both of the above two methods are included in the present invention.

After completion of the coding of one image, the switches 100, 101, 102, and 103 are switched. Due to this, the roles of the frame memory 4a and frame memory 4b are exchanged. That is, a reference image is read out from the frame memory 4a, the input image is written, the coding image is read out from the frame memory 4b, and the decoding image is written.

Figure 8:
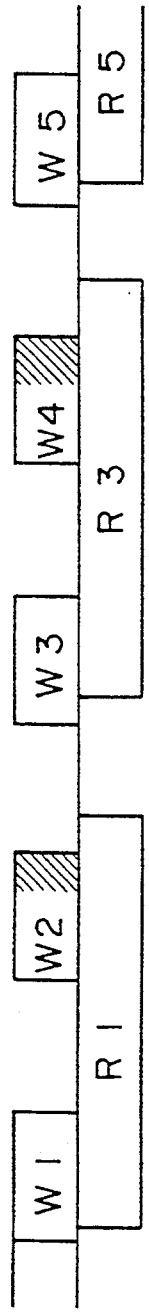
FIG. 8 is a timing chart when signals which are intermittently written are coded.
Figure 8:
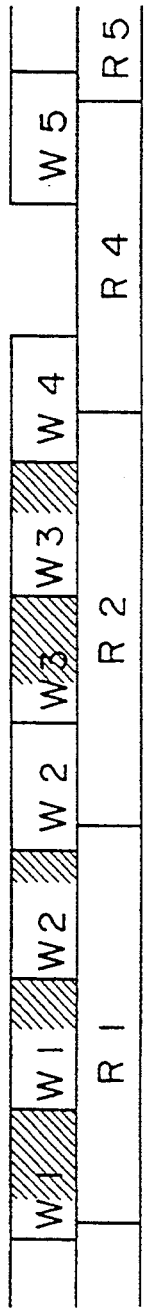

FIG. 8 shows an example in which coding images are intermittently written. For instance, the case of transmitting only one field corresponds to the example. In the alternate field transmission, only one of the two fields constructing the frame is transmitted. Therefore, the signals are intermittently written as shown in A of FIG. 8. When the signals are written into the frame memory of the construction of FIG. 4A, a waiting time occurs before the coding and reading operations as shown in A in FIG. 8.

Such a waiting time can be eliminated by constructing the frame as shown in B in FIG. 8. That is, a field to be written is stored once into an external memory and written twice into the frame memory. Consequently, the write signals become continuous and no waiting time occurs. In this instance, when the signal can be written at the first time (W₄ in B in FIG. 8), the writing operation of the second time is stopped. Therefore, a situation in which the same field is erroneously coded is eliminated.

FIG. 9 shows an example of a circuit construction in the case of B in FIG. 8. The circuits designated by reference numerals 1 to 10 in FIG. 9 perform the same operations as those of the circuits shown in FIG. 1. Reference numerals 110 to 113 denote a newly added circuit for reducing noises which is newly added. Component elements 201 to 209 correspond to the component elements 1 to 9 in the figures. While the component elements 1 to 9 execute the coding operation, the component elements 201 to 209 perform the decoding operation on the contrary. Prior to explaining the embodiment portion of the invention, the operation of the decoding section and the operation of the noise reduce will be first described.

In the decoding section, a signal 209 transmitted from a communication line is converted by a communication interface 208 into a signal 207 of a format such that it can be processed by a decoder 206. The decoder 206 decodes the signal 207 and reproduces an image (reception decoding image). The reception decoding image is stored into a frame memory 204 through a signal line 205. The signal stored in the frame memory 204 is read out and is generally converted into the analog NTSC signal by an NTSC encoder and D/A converter 202 and is displayed. In FIG. 9, although a video switch 210 is inserted between the NTSC encoder and D/A converter 202 and the frame memory 204, the operation of the video switch 210 will be described in detail hereinafter.

The noise reducer 112 executes an arithmetic operation every pixel with respect to the image to be coded and the image just before it or the image which has been coded just before (both of those images are referred to as pre-images in a lump), thereby eliminating the noise signals generated by the TV camera, A/D converter, and the like from the image signal to be coded. As a practical operating method, there can be mentioned a method whereby an average of the coding image and the pre-image of every pixel is set to a new coding image, or the like.

The frame memory 110 for storing the pre-image is needed for such a process. The digital image signal 111 is supplied to the noise reducer 112. On the other hand, the pre-image has been stored in the frame memory 110.

The pre-image is supplied to the noise reducer 112 through the signal line 113 synchronously with the input of the digital image signal 111. Noises are eliminated from the two signals supplied to the noise reducer 112. After that, the signals are again written into the frame memory 110 through the signal line 113. The image signal written in the frame memory 110 is transferred two times at a time to the frame memory 4 at a timing shown in B in FIG. 8. After that, the coding processes which have already been described in the descriptions regarding FIGS. 8 and 1 are executed in a manner similar to that described above.

Since the noise reducer executes the process synchronously with the image input, that is, the TV signal, such a process is finished in a predetermined period of time. Therefore, by starting the signal transfer to the frame memory 4 after the elapse of the predetermined period of time from the start of the process of the noise reducer, an inconvenience whereby the pixel whose noises are not yet reduced is transferred or the like doesn't occur. The frame memory 110 needs a simultaneous reading and writing type memory.

By providing the frame memory 110, the stored image can be read out synchronously with the display timing on the reception side and the synthesis of the picture plane with the reception decoding image 211 or the switching of the picture plane can be performed in the video switch 210. In the synthesizing process of the picture plane, there is a case in which the display screen fluctuates when the picture plane input timing on the transmission side is asynchronous with the picture plane display timing on the reception side. In this instance, both the image before the noise reducing process and the image after completion of the process mixedly exist in the image on the transmission side, so that it seems as if the picture plane is divided into two images. However, the picture plane without a fluctuation can be displayed by synchronizing the input with the display. A high speed memory such that the pixels can be read out for synthesis of the picture plane for a period of time from the completion of the noise reducing process of a certain pixel to the start of the noise reducing process of the next pixel is used as a frame memory 110, so that the picture plane synthesizing process, coding process, and noise reducing process can be simultaneously executed while commonly using the frame memory 110.

In the case of the inter-frame coding, a difference between the coding image and the pre-image is obtained simultaneously with the noise reducing process and a coding amount at a time point when the coding image is coded can be presumed on the basis of such a difference. As a method of presuming the coding amount, the following means can be enumerated, for example power of differential images obtained by calculating a difference between the coding image and the pre-image every pixel; the number of pixels of large amplitudes (large differences) among the differential images; power of the quantized differential images; the sum of the absolute values of the pixels of the quantized differential images or; the sum of the absolute values of the frequency components after the differential images were transformed into the frequency components by an orthogonal transformation.

In the above noise reducing process, the image which has been coded just before or the image which has been supplied just before is used as a pre-image. In the case of the inter-frame coding, since the decoding image which has been coded and decoded and reproduced just before has been stored in the frame memory 4a or 4b in FIG. 6, a coding efficiency is further improved by using the decoding image signal as a pre-image signal. The pre-image can also be read out from the frame memory 4a or 4b by the memory circuit 90 using the invention as shown in FIG. 7A. In the timing chart of FIG. 7B, the noise reducing process can be performed by reading out the reference signal 3 written in the frame memory 4b for the period of time shown by the input 3. Similarly, it is sufficient to read out the reference signal 7 for the period of time shown by $W_7$ in the diagram and to calculate the average value of both of the signals or the like. The presumption of the coding amount described above can be also similarly performed by using those signals.

According to the present invention, the number of frame memories can be reduced while maintaining the conventional delay time of the image and the conventional processing ability of the coding apparatus. Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. An image coding apparatus for sequentially coding an input image signal, which is supplied at a predetermined frame rate, at a rate that is independent of said frame rate and for obtaining a coding image signal for transmission from which frames are thinned out, comprising:

a frame memory having a recording area corresponding to one frame of the input image signal to store said input image signal;

a write address generator to sequentially generate write addresses in the frame memory in correspondence to said input image signal;

coding means for executing a coding process by using a signal which is read out from the frame memory and for generating a frame change request;

a read address generator to sequentially generate read addresses in the frame memory in response to said frame change request; and write limiting means for comparing said write addresses and said read addresses, for stopping a subsequent writing operation of the image signal frame written in the frame memory when a particular write address approaches a particular read address, and for restarting the writing operation from the head of the next frame.

2. An apparatus according to claim 1, further comprising reading operation delay means for delaying said frame change request and transferring operation to the read address generator when said particular write address is located within a predetermined range from the head of the frame when the frame change request is generated.

3. An image coding apparatus in which an input image signal that is supplied at a predetermined frame rate in accordance with a sequence of image scanning lines whose horizontal scan has priority over the vertical scan is sequentially coded at a rate that is independent of said frame rate, to thereby obtain a coded image signal for transmission from which frames are thinned out, comprising:

a frame memory having a memory area corresponding to one frame of said input image signal that is specified by horizontal and vertical two-dimensional addresses for storing said input image signal;

a write address generator for sequentially generating write addresses in the frame memory in accordance with said sequence of image scanning lines of said input image signal;

coding means for executing a coding process using a signal which is read out from the frame memory and for generating a frame change request;

a read address generator for sequentially generate read addresses in the frame memory in response to said frame change request; and write limiting means for comparing said write addresses and said read addresses, for stopping subsequent writing operation of frames written in the frame memory when a particular write address approaches a particular read address, and for restarting the writing operation from the head of the next frame.

4. An apparatus according to claim 3, wherein the write limiting means compares a vertical address of said particular write address and a vertical address of said particular read address.

5. An apparatus according to claim 3, wherein the write limiting means compares a value which is obtained by converting said particular write address into a one-dimensional address and a value which is obtained by converting said particular read address into a one-dimensional address.

6. An apparatus according to claim 3, further comprising reading operation delay means for delaying said frame change request and for transferring operation to said read address generator when said particular write address is located within a predetermined range from the head of the frame when the frame change request is generated.

7. An apparatus according to claim 6, wherein said reading operation delay means delays said frame change request when a vertical address of said particular write address is located within a predetermined range from the head of the frame.

8. An image coding apparatus for sequentially coding an input image signal, which is supplied at a predetermined frame rate, at a rate that is independent of said frame rate, thereby obtaining a coding image signal for transmission from which frames are thinned out. comprising:

first and second frame memories, each having a recording area, corresponding to one frame of the input image signal, for storing the input image signal;

coding means for executing a coding process by using both the input image signal which is read out from one of the first and second frame memories and a reference signal which is read out from the other one of the first and second frame memories;

decoding means for decoding a coded image signal from said coding means;

signal path change means for allowing the first and second frame memories to alternately execute a first operation for reading out the stored input image signal and supplying said read out signal to said coding means and writing the decoded image signal which is generated from said decoding means, and for reading out the stored decoded image signal as a reference signal and supplying said decoded signal to said coding means and writing the input image signal in response to the frame change request which is generated from said coding means; and write limiting means, provided for each of the first and second frame memories, for stopping a subsequent writing operation of the frames written when a write address of the input image signal in said second operation approaches a read address of the reference signal and for restarting the writing operation from the head of the next frame.

9. An image coding apparatus according to claim 8, further comprising control means for delaying the output of said read address when said write address is compared with said read address and said comparison result is smaller than a predetermined value.

10. An image coding apparatus comprising:

converting means for converting an input image signal to digital data;

a frame memory for storing said digital data corresponding to one frame of said input signal, including:

a write address generator for generating write addresses of said digital data to be written into the frame memory, a read address generator for generating read addresses of said digital data to be read out from the main memory, and means for outputting control signals to the read address generator by combining said write address with said read address; and coding means for coding said digital data read out from the frame memory in accordance with said read address.

* * * * *